United States Patent [19]

Schwede

[11] Patent Number: 5,414,815

[45] Date of Patent: May 9, 1995

[54] METHOD AND APPARATUS FOR TRANSFERRING DATA DIRECTLY BETWEEN A MEMORY DEVICE AND A PERIPHERAL DEVICE IN A SINGLE ADDRESS CYCLE UNDER THE CONTROL OF A PROCESSOR

[76] Inventor: Gary W. Schwede, 337 Calcaterra Ct., Palo Alto, Calif. 94306

[21] Appl. No.: 995,332

[22] Filed: Dec. 23, 1992

Related U.S. Application Data

[63] Continuation of Ser. No. 583,501, Sep. 17, 1990, abandoned.

[51] Int. Cl.⁶ .............................................. G06F 13/28
[52] U.S. Cl. ...................................... 395/275; 395/325
[58] Field of Search ................ 395/425, 275, 325, 550

[56] References Cited

U.S. PATENT DOCUMENTS

| | | | |
|---|---|---|---|
| 4,263,648 | 4/1981 | Stafford et al. ..................... | 395/550 |
| 4,417,304 | 11/1981 | Dinwiddie, Jr. ..................... | 395/425 |
| 4,847,750 | 7/1989 | Daniel ................................. | 395/425 |
| 5,001,624 | 3/1991 | Hoffman ............................. | 395/375 |

Primary Examiner—Jack B. Harvey
Assistant Examiner—Glenn A. Auve
Attorney, Agent, or Firm—Limbach & Limbach

[57] ABSTRACT

An improved computer system having DMA-like capabilities for transferring data between a memory device and a peripheral device. The system has a processor connected to an address bus and a data bus. A memory is also connected to the address bus and the data bus. A peripheral device is connected to the data bus. A decoder is connected to the address bus for decoding the address signal on the address bus generated by the processor. The decoder generates a first control signal in response to the address signal detected on the address bus. Transceivers or bus drivers are placed in the data bus which are responsive to the first control signal generated by the decoder. The transceivers permit data flow on the data bus directly between the peripheral device and the memory. By placing an address signal on the address bus such that the decoder would decode that address, the system causes the memory device to transfer data to or from the peripheral device.

17 Claims, 3 Drawing Sheets

METHOD AND APPARATUS FOR TRANSFERRING DATA DIRECTLY BETWEEN A MEMORY DEVICE AND A PERIPHERAL DEVICE IN A SINGLE ADDRESS CYCLE UNDER THE CONTROL OF A PROCESSOR

This is a continuation of application Ser. No. 07/583,501, filed on Sep. 17, 1990, now abandoned.

TECHNICAL FIELD

The present invention relates to a method and an apparatus which simulates the operation of a Direct Memory Access (DMA) device using a single microprocessor.

BACKGROUND OF THE INVENTION

In high performance computer system applications, data needs to be exchanged between the memory and the peripheral (input or output) devices at high speed. In the prior art, it is known to use a dedicated microprocessor to control the operation of the peripheral device as well as to control the transfer of data between the memory and the peripheral device (to or from). The microprocessor handles the required data transfer by means of programmed instructions. Usually, however, the transfer of data between the memory and the peripheral device (to or from) is accomplished over many cycles. This is accomplished by for example, loading the data into the accumulator of the processor, then writing the data to the memory or the peripheral device.

If programmed instructions controlling the processor to operate the transferred data between the memory and the peripheral device is not fast enough, a common solution is to use a DMA device.

A DMA device is a hardware device operating in conjunction with a processor to perform certain data transfers to or from the memory. DMA devices have the disadvantage of increasing hardware costs as well as complexities in initializing and controlling the DMA device. Further, there is time lost when the DMA device takes over from the processor and later returns control of the system buses back to the processor.

SUMMARY OF THE INVENTION

In the present invention, a computer system having an address bus, a data bus, a processor means connected to the address and data bus is disclosed. Further, the computer system has a memory which is connected to the address bus for receiving an address signal from the address bus. The memory is also connected to the data bus and provides data to or from the data bus from the locations addressed by the address bus. A peripheral device is connected to the data bus for reading data from or writing data to the data bus. In the improvement of the present invention, a decoder is connected to the address bus for decoding the address signal on the address bus generated by the processor. The decoder generates a first control signal in response thereto. Transceiver means are placed in the data bus which are responsive to the first control signal which permit data flow on the data bus directly between the peripheral device and the memory.

DETAILED DESCRIPTION OF THE DRAWINGS

Figure 1:
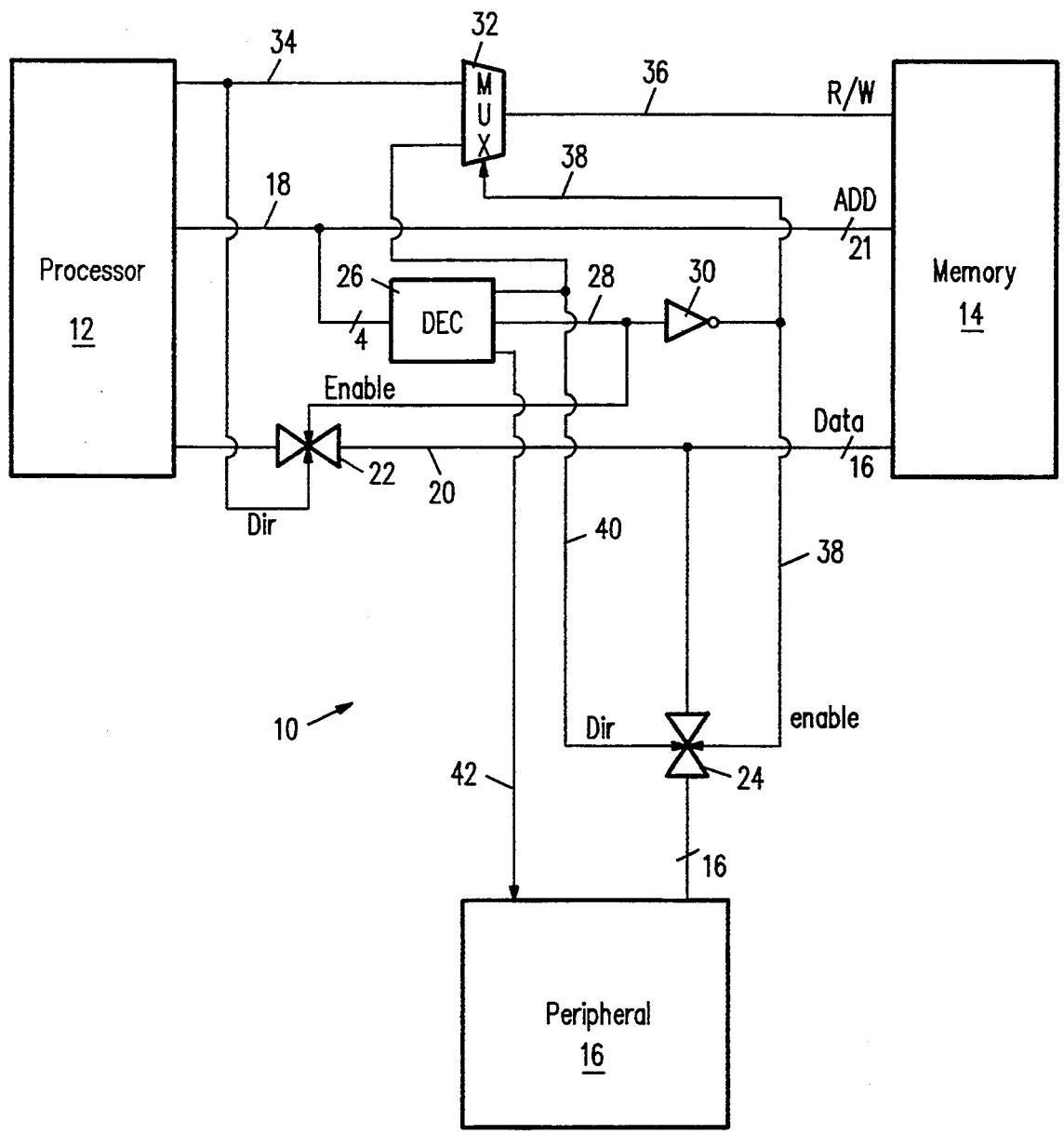
FIG. 1 is a schematic block level diagram of one embodiment of the computer system of the present invention.

Referring to FIG. 1 there is shown a schematic level block diagram of the computer system 10 of the present invention. The computer system 10 comprises a processor 12, an address bus 18 and a data bus 20. The processor 12 is connected to the address bus 18 and the data bus 20. The processor 12 provides an address signal on the address bus 18 and reads data from or writes data to the data bus 20. In one preferred embodiment, the processor 12 is a Motorola 68000 available from Motorola Inc. Since the processor 12 can address 16 megabytes of memory space, the processor 12 is connected to 24 lines of the address bus 18. The processor 12 also can receive data from or write data to the data bus 20 in a data path of 16 bits. Thus, the data bus 20 is 16 lines.

The system 10 also comprises a memory device 14. In one preferred embodiment, the memory device 14 constitutes 2 megabytes of memory space. Thus, the memory device 14 has an address space from 000000 (hexadecimal) to 1FFFFF (hexadecimal) (hereinafter, unless otherwise indicated, all address locations will be in the hexadecimal system). The memory device 14 is addressable by 21 of the 24 lines from the address bus 18. (In the preferred embodiment, where the processor is the 68000, there are 23 lines with two additional lines which indicate each of the 2 bytes in a 16 bit word.) The processor 12 generates a R/W signal 34. The R/W signal 34 is supplied to one input of a multiplexer 32. The output of the multiplexer 32 is supplied as the R/W control 36 to the memory device 14.

A peripheral device 16 is also provided. The peripheral device 16 can be any type of peripheral device 16 such as a check sum device, a disk controller device, or a SCSI bus controller. The data bus 20 connects the processor 12 to the memory device 14 to the peripheral device 16. A pair of transceivers or data bus drivers 22 and 24 are interposed in the data bus 20. First transceiver 22 is interposed in the data bus 20 such that it can control the data flow between the processor 12 and the memory device 14. The second transceiver 24 is interposed in the data bus 20 such that it can control the data flow between the memory device 14 and the peripheral device 16. Each of the transceivers 22 and 24 receives two controls: one to enable/disable the transceiver and one to establish the direction of communication.

The system 10 also comprises a decoder 26. The decoder 26 receives 4 of the high order bit lines of the 24 lines of the address bus 18. In response to the signals on the 4 lines received by the decoder 26, the decoder 26 generates a control signal 28 which is supplied to the enable input of the first transceiver 22. The first control signal 28 is inverted by an inverter 30 and the inverted first control signal 38 is supplied to the enable input of the second transceiver 24. The first control signal 28 enables/disables the first transceiver 22. The inverted first control signal 38 enables/disables the second transceiver 24. The R/W signal 34 from the processor 12 is also supplied to the direction input of the transceiver 22. The decoder 26 also generates a second control signal 40 which is supplied to the direction input of the transceiver 24 and to the other input of the multiplexer 32. The inverted first control signal 38 is also used to switch the multiplexer 32. The decoder 26 also generates a third control signal 42 which is supplied to the peripheral device 16.

There are two modes of operation for the system 10 of the present invention. In the first mode, the processor 12 operates to fetch instructions and data from memory device 14 in the conventional manner. In this mode of operation of the system 10, the 21 lines representing the 21 lowermost bits of the address bus 18 are supplied directly to the memory device 14. The 4 upper bits of the address bus 18 are set at the state of "000X", where X is governed by the most significant bit (21st bit) from the 21 lowermost bits supplied to the memory device 14. In response to this condition, the decoder 26 generates the first control signal 28 enabling the first transceiver 22 and permitting data flow between the processor 12 and the memory device 14 on the data bus 20. The first control signal 28 is inverted by the inverter 30 and the inverted first control signal 38 is supplied to the second transceiver 24. The inverted first control signal 38 disables the second transceiver 24 disabling the data communication on the data bus between the peripheral device 16 and the memory device 14. Thus, the linkage between the peripheral device 16 and the memory device 14 and the processor 12 on the data bus 20 would be as if there were an open circuit on the data bus 20 between the peripheral device 16 and the memory device 14.

The inverted first control signal 38 also switches the multiplexer 32 such that the R/W signal 34 from the processor 12 is supplied to the memory device 14. In addition the R/W signal 34 from the processor 12 is used to control the direction of communication of the data bus 20 by the first transceiver 22.

Thus, when data is to be read from the memory device 14, the R/W signal 34 is generated causing memory device 14 to perform a read, and causing the data on the data bus 20 to flow from the memory device 14 to the processor 12. If data is to be written into the memory device 14, the R/W signal 34 is generated in the opposite state.

In the second mode of operation, the processor 12 fetches instructions from the memory device 14, but then executes data transfers in a DMA-like manner. The instructions for the processor 12 to operate in this mode are stored in the address space 000000-1FFFFF. However, in executing data transfer from the memory device 14 to the peripheral device 16, the processor 12 issues a memory address command for the memory address starting at 400000. In this condition, the upper 4 bits supplied to the decoder 26 would have a bit configuration of "010X", (where X is determined by the 21st bit supplied to the memory device 14). The lower 21 significant bits would continue to be supplied directly to the memory device 14. The decoder 26 in response to the upper 4 bits of "010X" would cause the first signal 28 to be generated which is an inverse of the condition when the bits "000X" are present on the 4 most significant bits. In short, the bit configuration of "010X" on the upper 4 significant bits, would cause the decoder 26 to generate the inverted first control signal 28. The inverted first control signal 28, supplied to the first transceiver 22, would cause the first transceiver 22 to create an open circuit on the data bus 20 between the processor 12 and the memory device 14. The inverted first control signal 28, is inverted by the inverter 30, and causes the first control signal to be supplied to the second transceiver 24. The second transceiver 24 responds by connecting the data bus 20 between the peripheral device 16 and the memory device 14. In addition, the inverted first control signal 38 switches the multiplexer 32, so that the signal line 40 is connected to the memory device 14.

For a memory device 14 to peripheral device 16 operation, the second control signal 40 is generated such that it causes a read operation in the memory device 14. In addition, the second control signal 40 causes the second transceiver 24 to communicate in the direction from memory device 14 to peripheral 16.

Since in this condition, the data bus 20 is electrically connected to only the peripheral device 16 from the memory device 14, the signal on the data bus 20 is supplied to the peripheral device 16. In the event the peripheral device 16 is a check sum device, then the peripheral device 16 would operate on the signal present on the data bus 20. Thus, in a single memory address cycle, data from the memory device 14 is supplied onto the data bus 20 and directly to the peripheral device 16.

Figure 2:
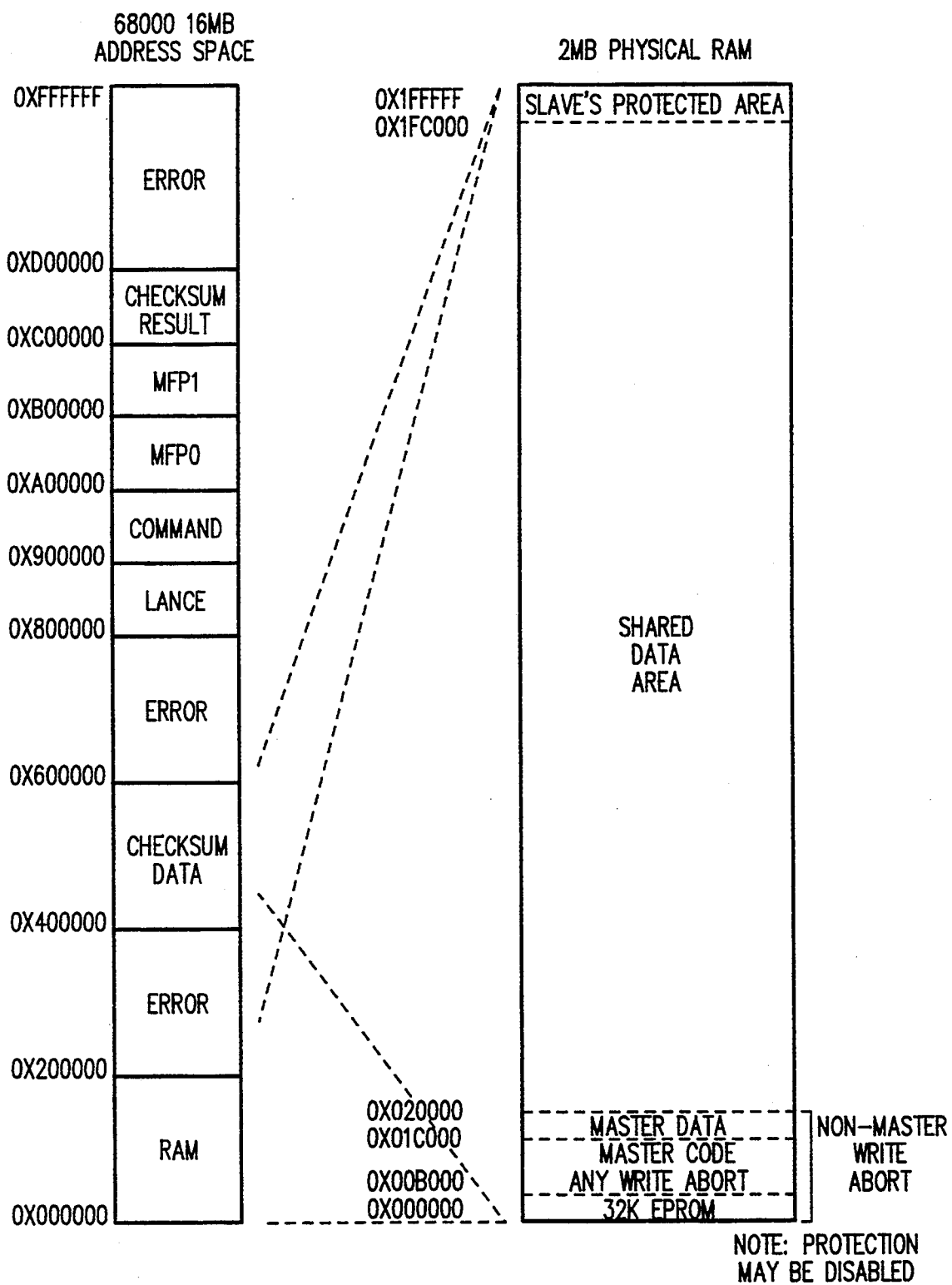
FIG. 2 is a map showing the address space addressable by the address bus of the system of the present invention mapped onto the physical locations in the memory device.

In the event it is desired to read data from the peripheral device 16 and write the data to the memory device 14, the system 10 performs the action as follows. The location at which the data is to be written in the memory device 14 is specified for the 21 lines of the lower significant bits on the address bus 18. The upper 4 address bits would be turned to a condition different from "010X" (which is read from memory device 14). (This can be the bit state of "011X" although the memory map on FIG. 2 shows "ERROR". This is because the memory map in FIG. 2 is shown where the peripheral device 16 is a check sum device, which only receives data from memory device 14, and does not write data to the memory device 14. Clearly, the invention is applicable to peripheral devices, writing data to or reading data from the memory device 14.) These upper 4 bits are supplied to the decoder 26. Thus, the processor 12 is simply addressing an address space not physically present, which is mapped to a physical space in the memory device 14. The decoder 26 would then cause the inverted first control signal 28 to be generated in response thereto. The inverted first control signal and the first control signal (as inverted by the inverter 30) would control the first and second transceivers 22 and 24, respectively, all as previously described.

In this mode of operation, the only change is that second control signal 40 causes memory device 14 to write data. Since second control signal 40 also controls the direction of communication for the second transceiver 24, the second transceiver 24 causes communication from the peripheral device 16 to the memory device 14. This would cause the data to flow from the peripheral device 16 onto the data bus 20 and directly into the memory device 14 into the address specified by the lower 21 bits of the address bus 18. In the event a third control signal 42 is desired to control the peripheral device 16, the third control signal 42 is generated.

As can be seen from the foregoing, when the processor 12 is operating in a normal mode of fetching instructions from the memory device 14 and executing them, the R/W signal 34 from the processor 12 is supplied to the memory device 14. However, when the processor 12 is operating in a DMA-like mode, the R/W signal 34 from the processor 12 is ignored.

Referring to FIG. 2 there is shown a schematic mapping of the address space addressable by the processor 12 and mapped to the 2 megabytes of the physical space of the memory device 14. As seen in FIG. 2, and as previously discussed, when the processor 12 issues an address signal on the address bus in the address range from "000000" to "1FFFFF", that address is mapped directly in to the memory device 14. Further, that address causes the decoder 26 to activate the first transceiver 22 such that the data bus is connected between the processor 12 and the memory device 14. In this configuration, the processor 12 accesses the memory device 14 directly.

When it is desired for the memory device 14 to transfer data directly to or from the peripheral device 16, the processor 12 places an address on the address bus 18 which is higher or greater than the physical address of the memory device 14. Thus, starting with the address of "400000" until the address space of "5FFFFF" that area of the memory is mapped directly onto the 2 megabytes of the physical memory device 14. The address defined in that region by those two addresses has the address bit pattern of "010" plus 21 bits of lower address space. When the upper 4 bits are so configured, the decoder 26 would cause the appropriate control signal to be generated causing the data on the data bus 20 to flow directly the memory device 14 to the peripheral device 16.

Although the embodiment shown in FIG. 1 shows a single first control signal 28 used to control both transceivers 22 and 24, clearly two separate enable control signals can be used, one for each transceiver 22 and 24. The use of two separate enable control signals has the advantage of there being no delay caused by the inverter 30. In addition, with two separate enable control signals, more than one additional memory subspace can be controlled.

The decoder 26 in the preferred embodiment is simply a programmable logic device. Referring to Appendix A, there is shown a definition of the pin inputs and the logic equations used to define the decoder 26, described by the CUPL language. Pins 1-4 are the 4 upper address bits. Pins 5, 6 and 7 provide various address, strobe and acknowledge inputs to the decoder 26. The outputs of the decoder 26 are specified by pins 12-15, and 17-19. The logic equations defining the relationship between the inputs and the outputs are also set forth on Appendix A. The control signal to activate the first transceiver 22 is the active low output of pin 12 as defined by the signal CARAM. The control signal which activates the second transceiver 24 is the active low output of pin 13 and is labeled CSGMEM. Other signals are mapped to other parts of the memory and are not germane to the present invention.

The advantage of the system 10 of the present invention is that with a single processor 12, the system 10 can operate in two modes. In the first mode, the processor 12 fetches instructions from the memory device 14 and executes the instructions like any other processor 12. In the second mode, the processor 12 fetches instructions from the memory device 14, but in executing the instructions the system 10 causes the transfer of data to or from the memory device 14 in a DMA-like operation. Thus, in the second mode of operation, certain instructions that are part of the instruction set of the processor 12 are executed in a manner other than their normal intended use.

For example, a single normal execution of the one-word-long 68000 instruction MOVEL (An)+ (An)+ specifies a double-word (4-Byte) read from memory, at address contained in address register n and a double-word (4-Byte) write to the next-higher double-word memory location, incrementing the address register in the process. This generates an ascending sequence of four addresses on the processor's address bus. In normal operation, two words (four Bytes) are transferred. In the second mode of operation, all four address cycles are used to transfer data words from peripheral to memory or vice versa. This results in an eight-Byte transfer. Thus, the instruction MOVEL in the appropriate address space would be executed in an entirely different manner than originally intended. Furthermore, with the instruction MOVEL, a single fetch overhead is applied to four word transfers. Thus, the appropriate selection of instruction can lower the overhead per data word transferred.

Thus, in the system 10 of the present invention, in the first mode of operation all instructions fetched from memory device 14, operating in address space between 000000 and 1FFFF are executed in their intended purpose. However, in the second mode of operation, certain instructions, fetched from the memory device 14, which operate on address as in the space between 400000 and 5FFFFF cause data to be transferred in a manner different from their intended use.

Figure 3:
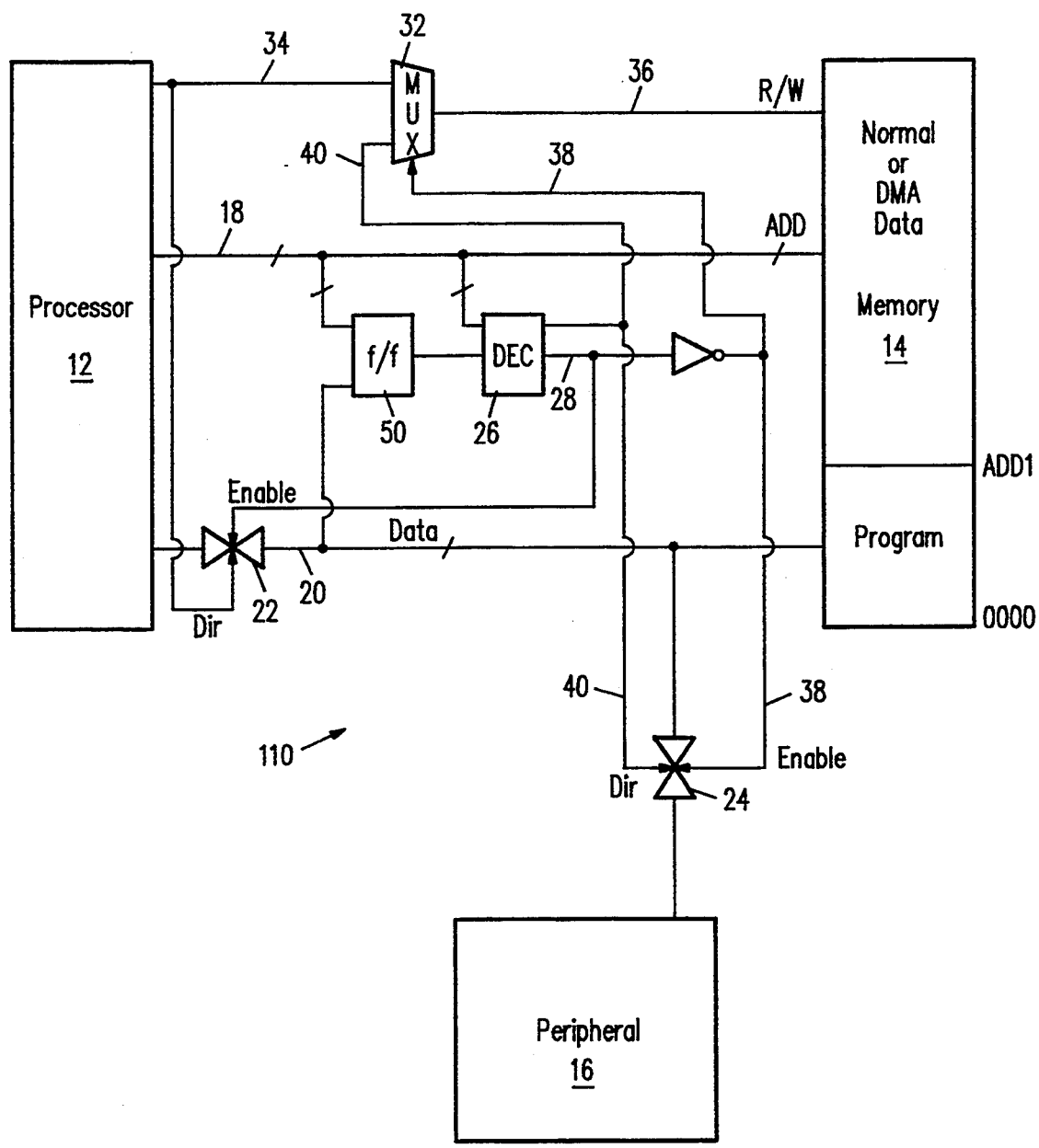
FIG. 3 is a schematic block level diagram of another embodiment of the computer system of the present invention.

Referring to FIG. 3, there is shown another embodiment of the computer system 110 of the present invention. In the embodiment shown in FIG. 3, the computer system 110 comprises a memory device 14, a peripheral device 16, and a processor 12. The computer system also comprises a R/W signal 34, an address bus 18, a data bus 20 and transceivers 22 and 24 similar to the components shown in FIG. 1.

The computer system 110 also comprises a flip-flop or register 50 which is connected to the data bus 20. The output of the flip-flop 50 is supplied to the decoder 26. The address bus 18 is also supplied to both the memory device 14 and the flip-flop 50. The output of the decoder 26 is used to control the transceivers 22 and 24. Further, the memory device 14 has a number of storage sites that is equal to the maximum number of storage sites addressable by the address signal generated on the address bus 20. The flip-flop 50 is addressable by the processor 12 in an address, such as a single bit address. However, the flip-flop 50 does not even have to be a part of the memory map. It can be internal to the processor 12.

Similar to the operation of the computer system 10, the computer system 110 has two modes of operation. In the first mode, the flip-flop 50 is loaded with one state, such as the bit pattern of "0". In that event, the instructions stored in the memory device 14 and fetched therefrom by the processor 12 are executed by the processor 12 in the manner in which they are normally intended. The output of the flip-flop 40 being low, would not cause the decoder 26 to be activated irrespective of the address on the address bus 18 supplied thereto. Thus, the transceivers 22 and 24 would remain in the condition where the data bus 20 is connected directed to the memory device 14, with the direction of transferred controlled by the R/W signal 34 from the processor 12.

In the second mode of operation, the computer system 110 operates in the manner of the present invention, i.e., providing DMA-like transfers between the peripheral device 16 and the memory device 14. The flip-flop 50 is set to the opposite state, e.g. bit of "1". As previously stated, however, a portion of the instruction for execution by the processor 12 must come from the memory device 14, even during this DMA-like operation. Let the instructions from the memory device 14 occupy an address space between 0000 and ADD1. In the second mode of operation, in the event the processor 12 retrieves or fetches instructions from the address space 0000 to ADD1, the decoder 26 has no effect irrespective of the state of the flip-flop 50. The instructions that are fetched from this address space are executed in their normal intended manner. However, in the event the instruction fetched from the space 0000–ADD1 generates an address outside 0000–ADD1, and in the event the flip-flop 50 is on indicating the DMA-like operation, the decoder 26 would detect that address and the output of the flip-flop 50 being high and would cause the transceiver 22 and 24 to switch, as previously described. This would then cause the instructions fetched from ADD1 to operate in a manner different from their intended purpose—namely in the transfer of data directly between the peripheral device 16 and the memory device 14.

The embodiments described in FIGS. 1 and 3 both show the processor 12 operable in two modes. However, in the embodiment shown in FIG. 1, no special action is required to enter into the DMA-like mode. DMA-like mode is entered by addressing a space greater than the addressable physical space. In the embodiment shown in FIG. 3, no address space is "wasted". However, a flip-flop or register must be set.

In both embodiments, however, even in the DMA-like operation, some means must be used to distinguish instruction fetches (which are instructions for the processor to operate in the DMA-like mode, but the instructions must be transferred normally from the memory to the processor) from data accesses (which trigger the special mode of transfer between peripheral and memory). There are two ways to accomplish this:

a) Use a status signal from the processor to discriminate instruction fetches from data transfers. (If the processor has such capability.) This allows instructions to be anywhere, even in a fully-populated memory; or b) Assume that any memory access in some part of memory is to proceed normally (i.e., between memory device 14 and processor 12). In the embodiment shown in FIG. 3, this is the memory space 0000–ADD1. In FIG. 1 this is the memory space 000000–1FFFF.

As can be seen from the foregoing, with the system 10 of the present invention, a dedicated microprocessor 12 can be used to accomplish data transfer at DMA speeds without the additional complexity of a DMA controller. Further, the data transfer between the memory device 14 and the peripheral device 16 can be accomplished in a single address cycle. In addition, there is no overhead in the setup for the DMA controller nor is there the overhead of the bus control transfer to and from a DMA controller. While the system of the present invention does have fetch overhead and the instructions must be fetched from memory before they are executed, this overhead, depending upon the type of instruction, can be amortized over many execution cycles.

In operating the computer system of the present invention, if the length of the block to be transferred between the memory device 14 and the peripheral device 16 is known in advance, the processor of the computer system of the present invention can be programmed with an appropriate number of data-move instructions equal to the length of the block to be transferred. Thus, fetching an appropriate number of data-move instructions from the memory with the appropriate address can cause the movement of the data in that address locations to or from the peripheral device 16.

However, if the length of the block of data to be transferred is not known in advance, external hardware can be supplied which detects the end of the transfer and interrupts the processor 12. If the processor 12 is in the middle of an instruction execution, the hardware detecting this condition can permit the processor to finish the instruction. Thereafter, the processor will be interrupted out of its data-move routine. Software can then redirect the return-from-interrupt to bypass the remainder of the data-move sequence, usually by adjusting the return-stack pointer.

Thus, the method and apparatus of the present invention greatly facilitates the transfer of data between a memory device and a peripheral device with such transfer being accomplished in a single address cycle.

What is claimed is:

1. A computer system having an address bus, a data bus, a processor means connected to said address bus and said data bus, a memory means connected to said address bus and said data bus, for receiving an address signal from said address bus during a memory address cycle and for reading data from or writing data to said data bus in response to the address signal on said address bus, a peripheral device means connected to said data bus for reading data from or writing data to said data bus, wherein the data bus directly interconnects said processor means, memory means, and peripheral device means, and wherein said processor means generates an address signal provided on said address bus during said memory address cycle, the system further comprising:

decoding means connected to said address bus for decoding said address signal on said address bus generated by said processor means during said memory address cycle, and for asserting a first control signal in response to a particular decoding during said memory address cycle; and transceiver means electrically segmenting said data bus and responsive to said first control signal during said memory address cycle for permitting data flow on said data bus directly between said peripheral device means and said memory means during said memory address cycle.

2. The system of claim 1 wherein said memory means has a number of storage sites fewer than the maximum number of storage sites addressable by said address signal generated by said processor means, and wherein said decoding means is connected to a portion of said address bus for decoding a portion of said address signal.

3. The system of claim 1 wherein said decoding means further comprises means for inverting said first control signal to produce an inverted first control signal, and wherein said transceiver means further comprises:

a first transceiver interposed between said processor means and said memory means; said first transceiver responsive to said first control signal being in a first state by permitting data flow between said processor means and said memory means on said data bus during said memory address cycle and responsive to said first control signal being in a second state opposite the first state by not permitting data flow between said processor and said memory means on said data bus;

a second transceiver interposed between said peripheral device means and said memory means; said second transceiver responsive to said inverted first control signal being in said second state by not permitting data flow between said memory means and said peripheral device means on said data bus, and responsive to said inverted first control signal being in said first state by permitting data flow between said memory means and said peripheral device means during said memory address cycle.

4. The system of claim 1 wherein said decoding means further comprising:
   means for decoding said address signal and for asserting a second control signal in response to said particular decoding;
   said second control signal supplied to said transceiver means; and
   said transceiver means responsive to said second control signal for controlling the direction of data flow on said data bus between said peripheral device means and said memory means.

5. The system of claim 4 wherein said peripheral device means supplies data to said data bus in response to said second control signal.

6. The system of claim 4 wherein said peripheral device means reads data from said data bus in response to said second control signal.

7. A computer system comprising:
   processor means for generating an address signal having a first portion and a second portion;
   memory means for receiving said second portion of said address signal directly from said processor means during a memory address cycle;
   decoding means for receiving said first portion of said address signal and for asserting a first control signal in response to a particular decoding during said memory address cycle;
   peripheral device means;
   a data bus directly interconnecting said processor means, memory means and peripheral device means; and
   transceiver means electrically segmenting said data bus and responsive to a first state of said first control signal for permitting data flow on said data bus between said processor means and said memory means during said memory address cycle, and responsive to a second state of said first control signal for permitting data flow between said peripheral device means and said memory means during said memory address cycle.

8. The system of claim 7 wherein said memory means has a number of storage sites fewer than the maximum number of storage sites addressable by said address signal generated by said processor means.

9. The system of claim 7 wherein said decoding means further comprises means for inverting said first control signal to produce an inverted first control signal and wherein said transceiver means further comprises:
   a first transceiver interposed between said processor means and said memory means; said first transceiver responsive to said first control signal being in a first state by permitting data flow between said processor means and said memory means on said data bus during said memory address cycle and responsive to said first control signal being in a second state opposite the first state by not permitting data flow between said processor and said memory means on said data bus;
   a second transceiver interposed between said peripheral device means and said memory means; said second transceiver responsive to said inverted first control signal being in said second state by not permitting data flow between said memory means and said peripheral device means on said data bus, and responsive to said inverted first control signal being in said first state by permitting data flow between said memory means and said peripheral device means during said memory address cycle.

10. The system of claim 7 wherein said decoding means further comprising:
    means for decoding said address signal and for asserting a second control signal in response to said particular decoding;
    said second control signal supplied to said transceiver means; and
    said transceiver means responsive to said second control signal for controlling the direction of data flow on said data bus between said peripheral device means and said memory means.

11. The system of claim 10 wherein said peripheral device means supplies data to said data bus in response to said second control signal.

12. The system of claim 10 wherein said peripheral device means reads data from said data bus in response to said second control signal.

13. A method of transferring data directly between a memory device and a peripheral device under the control of a processor generating an address signal supplied on an address bus, said method comprising:
    providing an address signal on said address bus by said processor during a processor address cycle;
    decoding a first portion of said address signal from said address bus and asserting a control signal in response to a particular decoding during said processor address cycle;
    supplying a second portion of said address signal from said address bus to said memory device during said processor address cycle; and
    controlling the direction of the flow of the data by a control means connected to said memory device and said peripheral device; said control means responsive to said control signal during said processor address cycle.

14. The method of claim 13 wherein a data bus interconnects said memory device, peripheral device and processor.

15. An apparatus for transferring data directly between a memory device and a peripheral device in a memory address cycle under the control of a processor generating an address signal during said memory address cycle supplied on an address bus, said apparatus comprising:
    means for decoding a first portion of said address signal supplied from said address bus during said memory address cycle and for asserting a control signal in response to a particular decoding during said memory address cycle;
    means for supplying a second portion of said address signal supplied from said address bus during said memory address cycle to said memory device during said memory address cycle; and means for directing the flow of the data, responsive to said control signal, directly between said memory device and said peripheral device during said memory address cycle.

16. An apparatus for transferring data directly between a memory device and a peripheral device in a memory address cycle under the control of a processor, said apparatus comprising:

- an address bus connecting said processor to said memory device for supplying an address signal from said processor to said memory device during said memory address cycle;
- a data bus connecting said processor to said memory device for supplying data between the memory device and the processor and from said memory device to said peripheral device for supplying data between the memory device and the peripheral device;
- a first transceiver means electrically connected to said data bus, said first transceiver means positioned between the processor and said memory device for controlling the flow of data therebetween;
- a second transceiver means electrically connected to said data bus, said second transceiver means positioned between the peripheral device and said memory device for controlling the flow of data therebetween;
- means for asserting a control signal during said memory address cycle;
- said control signal supplied to said first and second transceiver means; and
- said first and second transceiver means responsive to said control signal by permitting the flow of the data on said data bus directly between the memory device and the peripheral device during said memory address cycle.

17. The apparatus of claim 16, further comprising:

- means for receiving said control signal and for inverting said control signal to form an inverted control signal;
- said control signal is supplied to said first transceiver means; and
- said inverted control signal is supplied to said second transceiver means.

* * * * *